(12) United States Patent
Strandemar (10) Patent No.: US 8,853,631 B2
(45) Date of Patent: Oct. 7, 2014

(54) CAMERA WITH TWO VISUAL IMAGING SUBSYSTEMS FOR DETERMINING PARALLAX AND FOR FOCUSING AN INFRARED IMAGING SUBSYSTEM

(75) Inventor: Katrin Strandemar, Rimbo (SE)

(73) Assignee: FLIR Systems AB, Taby (SE)

( * ) Notice: Subject to any disclaimer, the term of this patent is extended or adjusted under 35 U.S.C. 154(b) by 247 days.

(21) Appl. No.: 13/442,241

(22) Filed: Apr. 9, 2012

(65) Prior Publication Data

US 2012/0218418 A1 Aug. 30, 2012

Related U.S. Application Data

(63) Continuation-in-part of application No. 12/624,333, filed on Nov. 23, 2009, now Pat. No. 8,153,971.

(51) Int. Cl.
  *G01J 5/02* (2006.01)
  *G01J 5/10* (2006.01)
  *G01J 5/08* (2006.01)
  G01J 5/00 (2006.01)

(52) U.S. Cl.
  CPC ............ *G01J 5/02* (2013.01); *G01J 2005/0077* (2013.01); *G01J 5/0275* (2013.01); *G01J 5/08* (2013.01); *G01J 5/0859* (2013.01); *G01J 5/10* (2013.01); *G01J 5/0846* (2013.01)
  USPC .......................................... 250/330; 250/332

(58) Field of Classification Search
  USPC .................. 250/330, 332, 334, 338.1, 339.01, 250/339.02, 339.05, 347, 348, 353, 370.08
  See application file for complete search history.

(56) References Cited

U.S. PATENT DOCUMENTS

| | | | |
|---|---|---|---|
| 7,820,967 B2 | 10/2010 | DeMarco et al. | |
| 2006/0289772 A1* | 12/2006 | Johnson et al. | .......... 250/370.08 |
| 2008/0099678 A1 | 5/2008 | Johnson et al. | |
| 2009/0010635 A1 | 1/2009 | Strandemar et al. | |
| 2009/0050806 A1 | 2/2009 | Schmidt et al. | |
| 2009/0302219 A1 | 12/2009 | Johnson et al. | |

FOREIGN PATENT DOCUMENTS

WO   WO 2006060746   6/2006

* cited by examiner

*Primary Examiner* — Mark R Gaworecki
(74) *Attorney, Agent, or Firm* — Haynes and Boone, LLP (57) ABSTRACT

A camera has an infrared (IR) imaging subsystem that includes an IR detector. The camera also has a visual imaging subsystem for generating a visual image of an observed scene. The camera also has one or more distance measuring devices for obtaining distance related information regarding a distance from the camera to the scene and a processor arranged to receive distance related information from one or more distance measuring devices and process the received distance related information, wherein said processing comprises determining a distance to the scene based on the received distance related information. The IR imaging subsystem may also include an IR optical element for focusing IR radiation on the IR detector. The IR optical element may be operable to focus the IR radiation on the IR detector based on the determined distance.

23 Claims, 8 Drawing Sheets

CAMERA WITH TWO VISUAL IMAGING SUBSYSTEMS FOR DETERMINING PARALLAX AND FOR FOCUSING AN INFRARED IMAGING SUBSYSTEM

CROSS-REFERENCE TO RELATED APPLICATIONS

This continuation-in-part patent application claims priority to and the benefit of U.S. patent application Ser. No. 12/624,333, filed Nov. 23, 2009, which is incorporated herein by reference in its entirety.

TECHNICAL FIELD

The present technology relates to a camera and in particular to a camera comprising both an infrared (IR) imaging subsystem and a visual imaging subsystem. The present technology also relates to a method of focusing such a camera.

BACKGROUND

A number of methods exist for focusing an IR camera. Focusing may be performed manually by adjusting the optics by hand. It may also be performed by automatic means by means of a focus motor based on some indication of object distance.

It is becoming more and more common that IR cameras, in addition to the IR imaging subsystem, also comprise a visual imaging subsystem. The provision of both an IR imaging subsystem and a visual imaging subsystem, among other things, allows for more sophisticated presentation of image data, in particular fused images, which means that part of the image is shown as IR data and the rest as visual image data. Various types of picture-in-picture techniques exist for creating fused images. Blending is another form of fusion and refers to presenting a value for each pixel based on both the IR data and the visual image data for that pixel.

Co-pending U.S. patent application Ser. No. 11/773,982 discloses a method of focusing an IR camera part in a camera also having a visual imaging part, based on the focus distance determined on the basis of the parallax between the IR image and the visual image.

None of the known methods for focusing an IR camera enables a continuous adjustment of the focus. The focusing function is becoming more and more important because many other features, such as temperature measurements, fusion alignment and image quality, depend on having correct focus.

SUMMARY

Embodiments of the invention may increase the usability of a number of such functions as defined above for an IR camera.

An embodiment of the invention relates to a camera comprising an IR imaging subsystem configured to obtain IR images of an observed scene, the IR imaging subsystem having an IR detector; a visual imaging subsystem configured to obtain a visual image of the observed scene; one or more distance measuring devices configured to obtain distance related information regarding a distance from the camera to the observed scene; and a processor arranged to receive distance related information from one or more distance measuring devices, the processor further being arranged to process the received distance related information, wherein the processing comprises determining a distance to the scene based on the received distance related information.

Another embodiment of the invention relates to a camera comprising an IR imaging subsystem for obtaining IR images, a first visual imaging subsystem and a second visual imaging subsystem, the first and second visual imaging subsystems being arranged such that images of an object taken by the first and second imaging subsystem respectively will have a known parallax function dependent on the distance to the object, and a processor arranged to determine a parallax between a first visual image of the object taken by the first visual imaging subsystem and a second visual image of the object taken by the second visual imaging subsystem.

The use of either distance measuring device information and/or two visual imaging subsystems in an IR camera may enable or simplify a number of functions in the IR camera and may provide certain advantages based on one or more embodiments disclosed herein. Some examples will be given below and described further herein.

The processor may also be arranged to determine a distance to the object based on distance related information received from one or more distance measuring devices and/or from a determined parallax in accordance with one or more embodiments.

According to an embodiment, a camera may be arranged to compensate for the determined distance during measurements, thereby achieving higher measurement precision.

According to an embodiment of the invention, the camera further comprises focus control means arranged to focus the IR imaging subsystem based on the distance to the observed scene and/or on the parallax. The processor may also be arranged to calculate a focus distance based on the distance to the observed scene and/or on the parallax, and the control means is arranged to focus the IR imaging subsystem based on the focus distance. This enables a continuous automatic focusing of the IR imaging subsystem, since the calculations are independent of the IR imaging function and can be performed without interrupting the IR imaging functions. The actual focusing is performed by changing the relative position between the detector and at least one optical element. This may be done by moving either the detector, the at least one optical element, or both. The focus distance may be based on the distance to the object.

According to an embodiment, there is provided a non-transitory computer-readable storage medium comprising computer executable instructions for receiving distance related information from one or more distance measuring devices; determining a distance to the scene based on the received distance related information; and focusing an IR imaging subsystem based on the determined distance.

Another embodiment is a method of focusing a camera having an IR imaging subsystem, a visual imaging subsystem, and one or more distance measuring devices, the method comprising obtaining distance related information regarding a distance from the camera to an observed scene, using the one or more distance measuring devices; determining a distance to the scene based on the received distance related information; and focusing an IR imaging subsystem based on the determined distance.

Another embodiment is a non-transitory computer-readable storage medium comprising computer executable instructions for obtaining a first visual image of an object using a first visual imaging subsystem of a camera, obtaining a second visual image of the object using a second visual imaging subsystem of the camera, determining an image parallax between the first and second visual image, and focusing an IR imaging subsystem based on the determined parallax.

The scope of the invention is defined by the claims, which are incorporated into this Summary by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
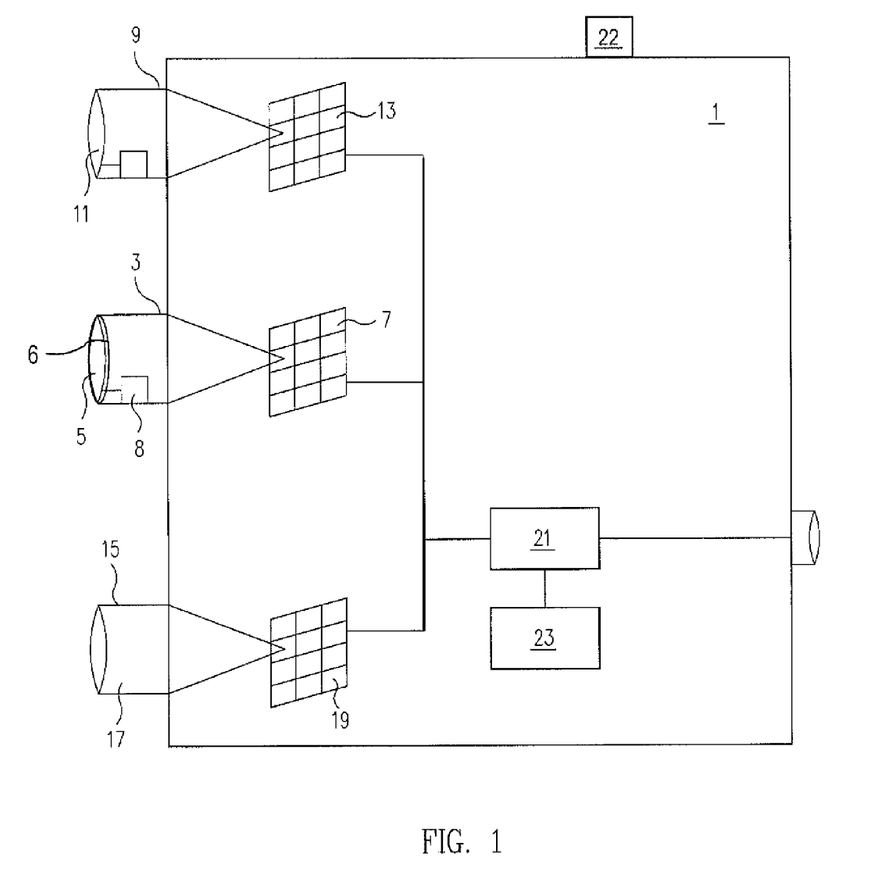
FIG. 1 illustrates a camera according to an example embodiment.

FIG. 1 illustrates a camera 1 according to an example embodiment of the invention. The camera comprises an IR imaging subsystem 3 that includes an IR detector 7 and IR optics 5 for focusing incoming radiation onto the IR detector 7. A focusing device for automatic focusing, such as a focus motor 8, is provided for the IR imaging subsystem 3.

The camera also comprises a first visual imaging subsystem 9 having optics 11 for focusing incoming visual light onto a first visual light detector 13 in the camera. According to an embodiment, the camera further comprises a second visual imaging subsystem 15 having optics 17 for focusing incoming visual light onto a second visual light detector 19 in the camera. The focusing of the optics is performed to ensure optimal focusing of the incoming radiation onto the detector, and may be performed manually or automatically by methods known in the art. Imaging subsystems having fixed focus are also known in the art and may also be used in this context. According to embodiments, one or more distance measuring devices are integrated in, connected to, and/or coupled to the camera 1 (e.g., distance measuring device(s) 22 as shown in FIG. 1). The one or more distance measuring are arranged to obtain distance related information regarding a distance from the camera 1 to an observed scene, or to one or more objects comprised in the scene. The one or more distance measuring devices may for example comprise a selection of the following: a distance sensor, a laser range finder, a time of flight sensor, and/or an ultra-sonic distance measuring device.

According to an embodiment, the images detected by all three detectors 7, 13, 19 are fed to a processor 21. Typically, the processor 21 performs some image processing as is known in the art. According to an embodiment, the processor 21 is arranged to receive distance related information from the one or more distance measuring devices. According to an embodiment, the processor 21 is further arranged to process the received distance related information, wherein the processing comprises determining the distance to the observed scene, or to one or more objects present in the scene, based on information received from the one or more distance measuring devices.

According to an embodiment, the camera 1 is arranged to compensate for the determined distance during measurements, thereby achieving higher measurement precision. As is well known in the art, IR measurements are affected by atmospheric disturbances that increase with increasing distance between the measurement device, for example the camera 1, and the measurement object, for example the observed scene. In other words, when performing IR measurements, for example using a camera 1, the received signal level or signal strength is decreased in dependence of the distance to the measured scene, since the IR radiation emitted by the scene is partly absorbed as it passes through the medium of air.

According to embodiments described herein, the distance from the camera 1 to the observed scene is determined, thereby enabling determining the signal strength reduction dependent on the distance, according to a known or predetermined relationship between the signal strength reduction and the distance between the camera 1 and the observed scene, and further to compensate for the determined signal strength reduction.

According to an embodiment, the processor 21 is operable to determine the decrease in signal strength as a function of the determined distance to the observed scene, and further to compensate for the decrease in signal strength by increasing the measured IR or temperature values accordingly before they are presented to a user, for instance in the form of an IR image with underlying IR or temperature information. Furthermore, since the distance is determined automatically by the processor 21, no manual interaction is required by the user in order to obtain the compensation.

According to an embodiment, the humidity of the air surrounding the camera 1 is also determined, for example using a humidity sensor or by calculating a humidity value based on temperature information in manners known to a person skilled in the art. According to this embodiment, the obtained humidity value or values may also be compensated for, in addition to compensating for distance, thereby in some cases providing even higher measurement precision. According to an embodiment, the processor 21 is operable to receive humidity information from a humidity sensor and further use the received information in the compensation described above by also compensating for the contribution of the air humidity to the reduction in signal strength, wherein the contribution of the air humidity to the reduction in signal strength is well-known to a person skilled in the art.

According to an embodiment, the IR imaging subsystem 3 further includes an IR optical element 6 for focusing IR radiation on the IR detector based on determined distance. According to an embodiment, this IR optical element (e.g., represented by IR optical element 6) is within (or part of or associated with) the IR optics 5 described above. According to an embodiment, the processor 21 is further operable to calculate a focus distance based on the determined distance and the IR optical element 6 is operable to focus IR radiation on the IR detector 7 based on the focus distance.

According to an embodiment, the processor 21 is further operable to determine a displacement between an IR image taken by the IR imaging subsystem 3 and the visual image taken by the visual imaging subsystem 15, align the IR image and the visual image based on the displacement, and present at least one of a fused image or a blended image based on the IR image and the visual image. According to an embodiment, the processor 21 is further operable to determine a first and a second displacement for at least a first and a second part of the IR image, respectively, and align the first and second part of the image based on the first and second displacement, respectively.

According to an embodiment, the processor 21 is arranged to determine a parallax between the first and the second visual image based on at least part of the respective images.

Of course, separate processors might be provided for performing different parts of the functionality if this is considered feasible. The operation of the processor may be controlled by computer executable instructions. One or more memory units, here shown as one memory unit 23, are arranged in connection with the processor. The memory units 23 are used to store image data, but also to store computer executable instructions, tables, etc. to be used by the processor when performing the functions of the camera.

As will be discussed in the following, the parallax between the first and the second visual images is dependent on the distance to the object, and therefore also on the focusing distance of the imaging subsystems. Therefore, if the relationship between the parallax and the focusing distance, or the distance to the object, is known, the parallax between the two visual images can be used to determine the distance to the object. According to another embodiment, the distance to the object may be determined using one or more suitable distance measuring devices known in the art, such as for example a selection of the following: a distance sensor, a laser range finder, a time of flight sensor, and/or an ultra-sonic distance measuring device, as described in connection with FIG. 1 above. As will be understood, the parallax may differ for different parts of the images, if the distance to the imaged object or area varies within the image. The parallax may be determined for only one part of the image or independently for different parts of the image. If the parallax is determined for only one part of the image, this part can be determined in different ways. For example, the central portion of the image can be selected by default. Alternatively, the processor may be arranged to determine the most common object distance in the image based on the parallax. This may be done on a pixel-per-pixel basis or for groups of pixels. Alternatively, it may be possible for an operator to select a portion of the image for which the parallax should be determined, for example, the portion containing an object of interest.

If the parallax is to be determined for more than one portion this may be done in different ways, for example by dividing the first and second visual image into sub-images and determining the parallax separately for each sub-image as will be discussed in connection with FIG. 4.

Figure 2:
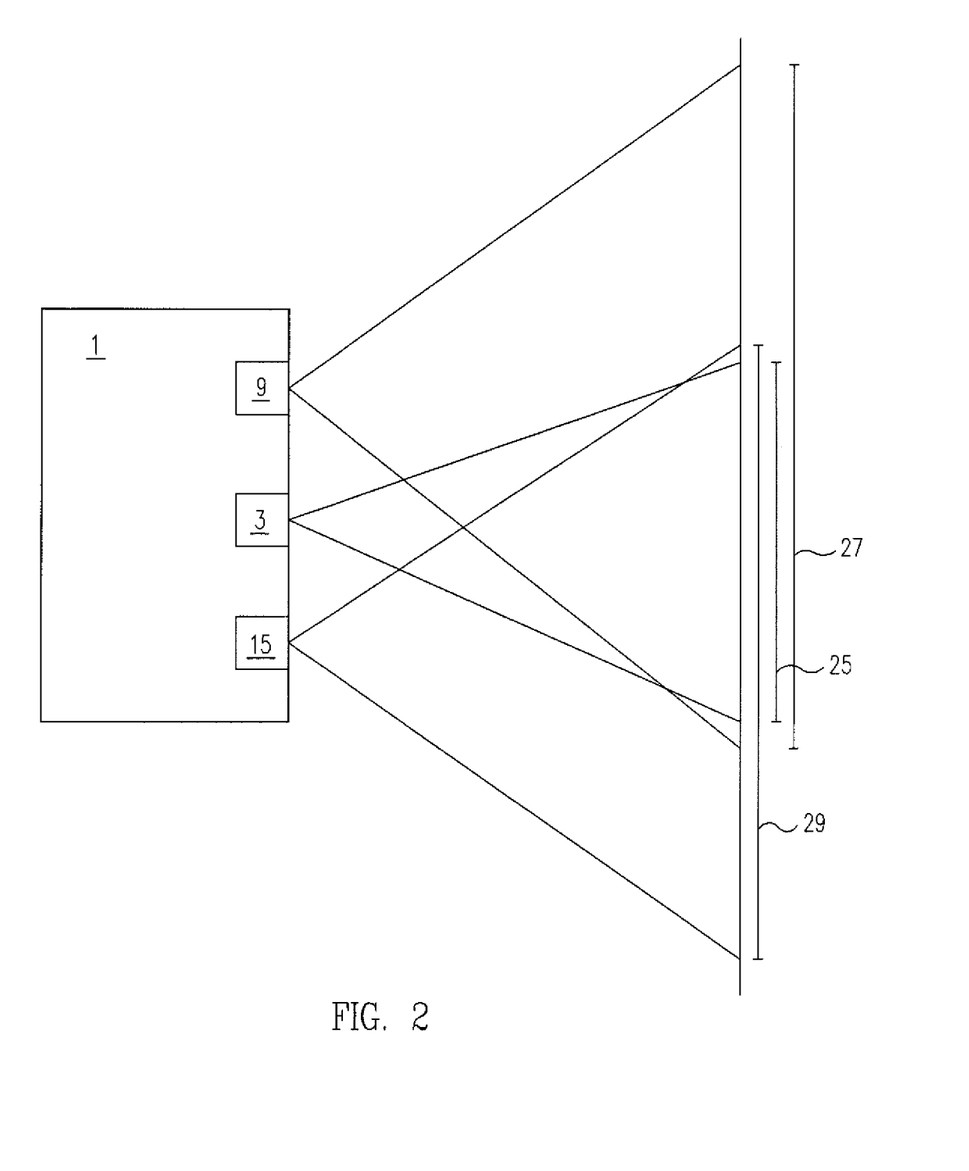
FIG. 2 illustrates the fields of view of the different imaging subsystems according to an example embodiment.

FIG. 2 illustrates the fields of view of the IR imaging subsystem 3 and the first and a second visual imaging subsystem 9, 15, respectively, of a camera such as the camera shown in FIG. 1. The three imaging subsystems are positioned in a fixed relationship to each other and images generated by the imaging subsystems therefore have a predetermined parallax between them. The IR imaging subsystem has a first IR field of view 25. The first visual imaging subsystem 9 has a first visual field of view 27, and the second visual imaging subsystem 15 has a second visual field of view 29.

In FIGS. 1 and 2, the three imaging subsystems 3, 9, 15 are shown positioned along a straight line, with the IR imaging subsystem 3 between the two visual imaging subsystems 9, 15. As will be understood, the imaging subsystems can be positioned relative to each other in any suitable way.

Two factors contribute to the relative displacement of the images: First, the distance between the imaging subsystems on the camera causes a displacement of the images that is constant in meters but decreases in number of pixels with increasing distance to the object. Second, the optical axes are normally not perfectly parallel. The angle between them causes a displacement that varies in meters with the distance to the object but is constant in number of pixels. The term parallax as used in this object includes the combined displacement caused by the distance between the imaging subsystems and the angle between the optical axes.

As seen in FIG. 2, the first visual imaging subsystem 9 has a first visual field of view 27 and the second visual imaging subsystem 15 has a second visual field of view 29. The first and second visual fields of view are partially overlapping and are displaced by a constant distance relative to each other, which constitutes the parallax. The IR imaging subsystem 3 has an IR field of view 25, which is typically narrower than the first and second visual fields of view. The parallax between the first and second visual fields of view can be used to determine the distance to the object. There is also a parallax between the IR field of view and each of the first and second fields of view, but these will not be discussed here. As shown in FIG. 2, the first and second visual fields of view 27, 29 may have a much greater angle than the IR field of view 25, so that each of the visual fields of view includes the full IR field of view.

Figure 3A:
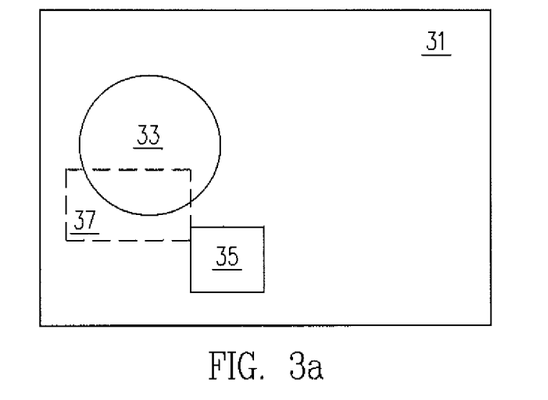
FIGS. 3a-3c illustrate the comparison of the two visual images according to an example embodiment.
Figure 3B:
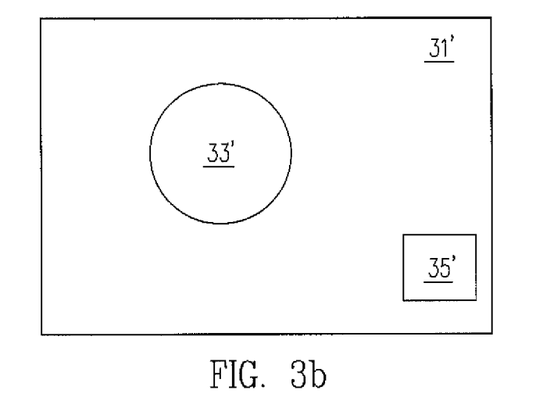

FIGS. 3*a* and 3*b* illustrate schematically a first visual image 33 taken by the first visual imaging subsystem and a second visual image taken 33' by the second visual imaging subsystem, respectively, of the same scene at the same time. The two images 33, 33' comprise essentially the same objects, but slightly shifted with respect to each other. The magnitude shift is dependent on the distance between the camera and the object in a way that may be obtained during calibration of the camera and/or during operation using one or more distance measuring devices integrated in, connected to or coupled to the camera. For simplicity, the objects shown in the images are a circle 33 and a square 35, the circle is assumed to be farther away from the camera than the square. Therefore, the displacement of the square 35, 35' is greater than the displacement of the circle 33, 33' between the two images 31, 31'.

The direction of the shift is well-defined for each individual camera and is dependent on how the visual imaging subsystems are positioned relative to each other.

The shift between the first and second image may be determined in any suitable way. For example, a square such as the dashed square 37 shown in FIG. 3*a* may be defined in the first image and compared to corresponding areas in the second image in a suitable way. Assuming that the visual imaging subsystems 9, 15 are positioned on the same horizontal level, the images will be displaced in the horizontal direction, as shown in FIGS. 3*a* and 3*b*. In this case, one solution would be to slide the square horizontally across FIG. 3*b*, in other words, to compare it to squares on the same horizontal level to find the one whose values best match the ones in the square selected in the first image. The actual comparison may be made in any suitable way. A simple solution would be to subtract the images from each other and find the minimum of the match function. Alternatively, cross-correlation may be used. This would also provide a quality indicator.

The direction in which the square should be slid across the image depends, of course, on the direction in which the images will be displaced, which in turn depends on the orientation of the imaging subsystems relative to each other. In the example above, the displacement will be purely horizontal. In another configuration, the displacement may be only in the vertical direction. In that case, the square should slide vertically. If there is displacement in both the horizontal and the vertical direction, any direction that will capture a component of the displacement may be used. In general, if the magnitude of the displacement and the angle between the direction of displacement and the direction of sliding are known, the shift between the images can be determined.

Figure 3C:
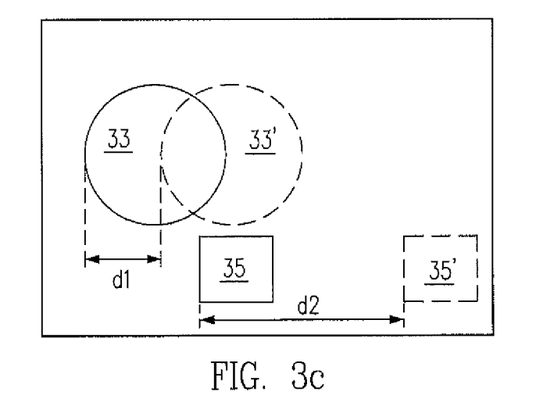

FIG. 3c shows FIG. 3b superimposed on FIG. 3a, only for illustration purposes. As can be seen, the circle 33' is displaced by a first distance d1 corresponding to a first number of pixels in the second image compared to the first image. The square 35' is displaced by a second distance d2 corresponding to a second number of pixels which is higher than the first number of pixels. The number of pixels in each case can be used to determine the distance to each of the objects. As will be understood, the displacement can be performed for only one object, or for any number of objects in the image. As described above, according to different embodiments, one or more distances to one or more parts of the observed scene or to an object comprised therein may be also determined using any suitable distance measuring device, as described above, or using the parallax between two captured visual images. It is possible to create a distance map for all objects. In this context, all objects in the IR field of view are of interest. A distance map would enable focusing on each object in the image separately.

According to an embodiment, the processor 21 is operable to determine the distance to one or more parts of the observed scene or to objects comprised therein and present the distance information in a distance map.

According to an embodiment, the processor 21 is operable to control the IR optical element (e.g., IR optical element 6) to focus on each object in the image separately, based on the distance map.

Figure 4:
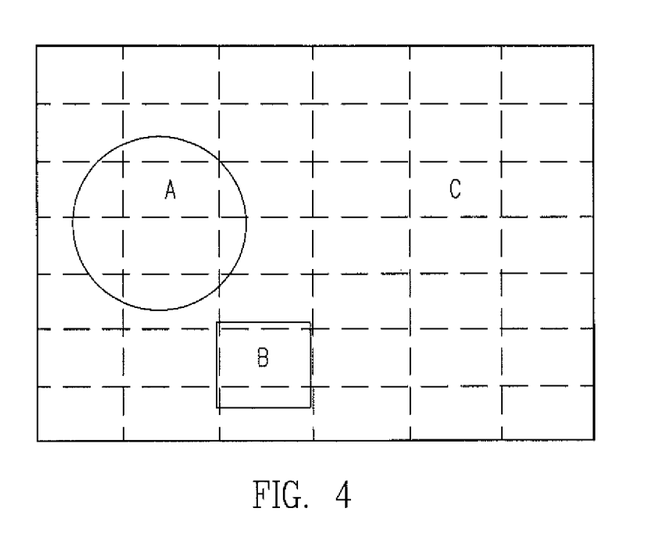
FIG. 4 illustrates a distance map for an image according to an example embodiment.

An example of a distance map is shown in FIG. 4. The distance map corresponds to the image shown in FIG. 3a. According to the embodiment exemplified in FIG. 4, the image has been divided into smaller rectangular areas and the distance to the imaged scene in each of the squares is determined on the basis of the parallax between the first and second images in this square and/or determined using one or more distance measuring devices integrated in, connected with, or coupled to the camera 1. For example, for the rectangle denoted A, the distance to the circle 33 will be determined. For the rectangle denoted B, the distance to the square 35 will be determined. For the rectangle denoted C, the distance to the background will be determined. According to another embodiment, a laser range finder or time of flight sensor may be used to produce a distance map for an observed/imaged scene or object from a single measurement session, in manners known in the art.

As can be seen in FIG. 4, in some cases the square will have pixels representing different object distances. This may be handled in several different ways. For example, the pixels in the portion of the square that has the best contrast may dominate.

To be able to use the parallax between the visual images in calculations to determine the distance to the object, the relationship between the parallax and the distance to the object must be determined during calibration. This calibration is performed individually for each camera to correct for the actual positioning of the imaging subsystems, which is subject to tolerances.

The relationship between the focusing distance dF and the distance z to the object is given by equation (1), which is well-known in the art.

$$dF = a/z + b \qquad (1)$$

In equation (1), a is a constant depending on the focal length of the optics, and b is a constant dependent on the focusing distance in the case of far focus.

The relationship between the parallax T and the object distance z is given by equations (2) and (3):

$$Tx = ax/z + bx \qquad (2)$$

$$Ty = ay/z + by \qquad (3)$$

Here Tx indicates the horizontal displacement between the first and second visual light image and Ty indicates the vertical displacement Constants ax, bx, ay and by represent the horizontal and vertical displacement, respectively.

The constants ax, bx, ay, and by are determined for each camera in calibration proceedings before delivery. How to do this is well known in the art. The distance z to the object can then be determined based on the parallax by one of the following equations (4) and (5), based on equations (2) and (3), respectively:

$$z = \frac{a}{T_x - b_x} \qquad (4)$$

$$z = \frac{a}{T_y - b_y} \qquad (5)$$

As described above, according to another embodiment the distance to the object may be determined using one or more suitable distance measuring devices known in the art, such as for example a selection of the following: a distance sensor, a laser range finder, a time of flight sensor and/or an ultra-sonic distance measuring device. According to embodiments, a distance measuring device (e.g., distance measuring device 22) may be integrated in, connected to, or coupled to the camera 1.

According to an embodiment, focusing is accomplished by a method of focusing a camera having an IR imaging subsystem, and a visual imaging subsystem and one or more distance measuring devices. According to an embodiment illustrated in FIG. 11, the method comprises the following operations.

Figure 11:
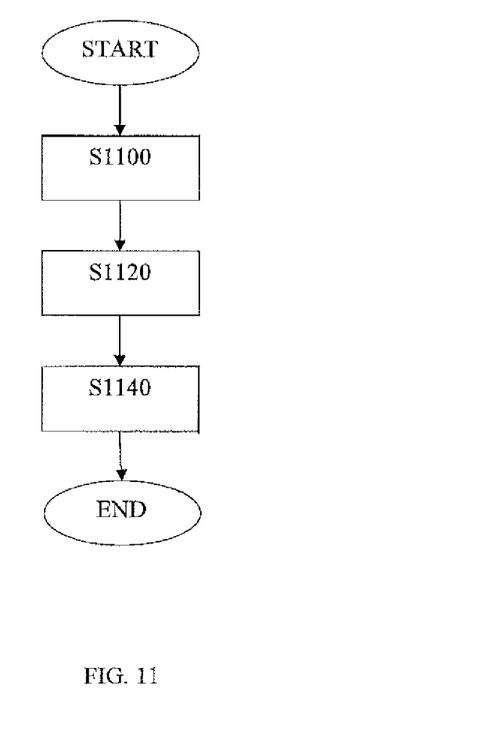
FIG. 11 is a flow chart of a method for focusing the IR imaging subsystem according to an example embodiment of the invention.

S1100: Obtaining distance related information from one or more distance measuring devices.

According to an embodiment, the distance related information is related to a distance from the camera to an observed or imaged scene.

S1120: Determining a distance to the observed or imaged scene based on the received distance related information.

According to an embodiment, the distance related information is received in a form that is directly interpretable by the processor 21. The processor 21 may thereby for example determine the distance to the observed or imaged scene directly from the received distance related information, or by use of a predetermined relationship between the received distance related information and the distance to the observed or imaged scene.

According to an embodiment, the distance related information is a distance image or distance map, wherein distances to more than one point in the observed scene are represented. According to an embodiment, there is a distance between the measuring device used for obtaining the distance related information and the IR imaging subsystem 3, causing a parallax error between the received distance related information and an IR image captured by the IR imaging subsystem 3. According to this embodiment, step S1120 comprises processing in the form of aligning the received distance related information with the IR image to compensate for the parallax. Thereby, more accurate distance information is obtained before the focusing of step S1140, described below, is performed.

According to an embodiment, the processor 21 is operable to receive the distance related information and process it in order to obtain the distance to the observed or imaged scene. According to an embodiment, the processor 21 is operable to process the received distance information by aligning it with an IR image captured using the IR imaging subsystem 3, in manners known to a person skilled in the art. According to an embodiment, the processor 21 is operable to process the received distance information by converting the coordinates of the received distance information, for example being in the form of a distance image or distance map, to the coordinate system of the IR imaging subsystem, according to a relationship determined in design, production, and/or calibration of the camera 1.

S1140: Focusing the IR imaging subsystem based on the determined distance.

Figure 5:
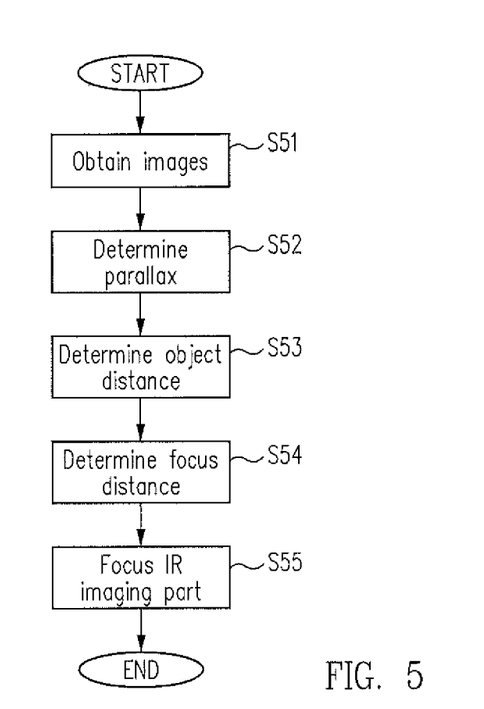
FIG. 5 is a flow chart of a method for focusing the IR imaging subsystem according to an example embodiment of the invention.

FIG. 5 is a flow chart of the method according to an example embodiment of the invention, in which the information is used to determine the focus distance in order to focus the IR imaging subsystem.

Step S51: Obtain a first and second visual image.

Step S52: Determine the parallax between first and second visual image.

Step S53: Determine the distance to the object.

According to an embodiment, the parallax determined from Steps S51 and S52 is used to determine the distance to the object.

According to another embodiment, Steps S51-S52 are omitted and in Step S53 the distance to the object, from the camera 1, is determined using one or more distance measuring devices, such as for example a selection of the following: a distance sensor, a laser range finder, a time of flight sensor and/or an ultra-sonic distance measuring device. According to an embodiment, the processor 21 of the IR camera 1 is arranged to receive and process distance related information input from the one or more distance measuring devices (e.g., distance measuring device 22 of FIG. 1).

Step S54: Use distance to object to determine focus distance.

Step S55: Focus IR imaging subsystem based on focus distance.

Obtaining the first and second visual images in Step S51 may occur contemporaneously, e.g., at the same time or about the same time. Steps S52-S55 may be performed by a computer program stored in memory and run in the processor 21 of the IR camera. According to the embodiment wherein Steps S51-S52 are omitted and Step S53 is performed by determining the distance to the object using one or more distance measuring devices, steps S54-S55 may be performed by a computer program stored in memory and run in the processor 21 of the camera 1.

As will be understood, the calculations in step S53-S55 can be combined so that in practice the focus distance is determined directly from the parallax. The calculations can be performed for one part of the image or for several parts of the image, as discussed above.

The information obtained from the two visual imaging subsystems of the example embodiment can be used in a number of applications in addition to, or instead of the continuous autofocusing application discussed above.

For example, the information may be used to present information to the user about the distance to objects in different parts of the image. As above, the distance is calculated on the basis of the parallax between the first and second visual images in the area or the object of interest and/or by use of one or more distance measuring devices. The areas or objects may be selectable by the operator, or information may be presented related to a particular part of the image as a default. It would also be possible to present the most common distance, or an average value of all distances, calculated on pixel level or a suitable sub-image level. Alternatively, the distance information may be presented in a distance map as shown in FIG. 4.

In another example embodiment, a camera having two visual imaging subsystems and an IR imaging subsystem, or a visual imaging subsystem and one or more distance measuring devices and an IR imaging subsystem, may be used for perspective correction.

Figure 6A:
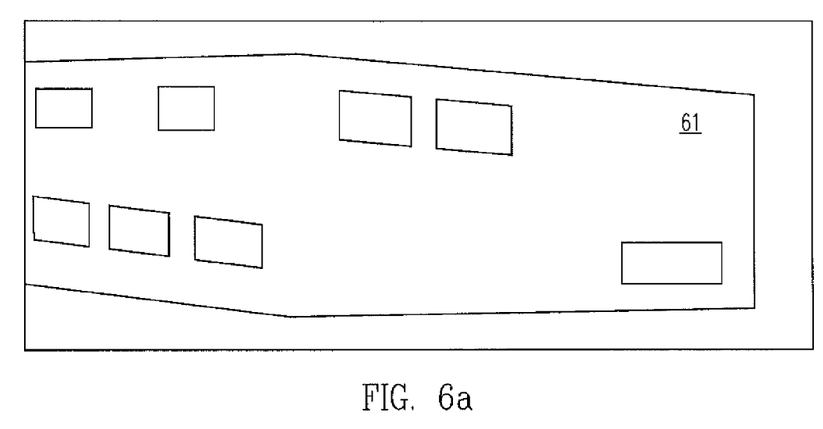
FIGS. 6a-6b illustrate the perspective effect and its correction, respectively, according to an example embodiment.

Perspective in images implies that an object will appear smaller in the image the farther away from the camera it is. In images of buildings, this means that walls can appear not to be parallel and that the building appears wider closer to the camera. Perspective effects are particularly pronounced in panorama images. FIG. 6*a* shows a schematic example of the perspective effect using a building 61 for illustration. As can be seen, the building clearly appears taller at the center, which it is not.

In many cases it is desired to correct for the effects of perspective, so that for example buildings or other wide objects can be imaged with the correct proportions and so that lines that are parallel really appear as parallel in the image. Image processing software products often have some form of correction for perspective effects. However, for a perfect correction is it necessary to know the distance from the camera to the imaged object.

Figure 6B:
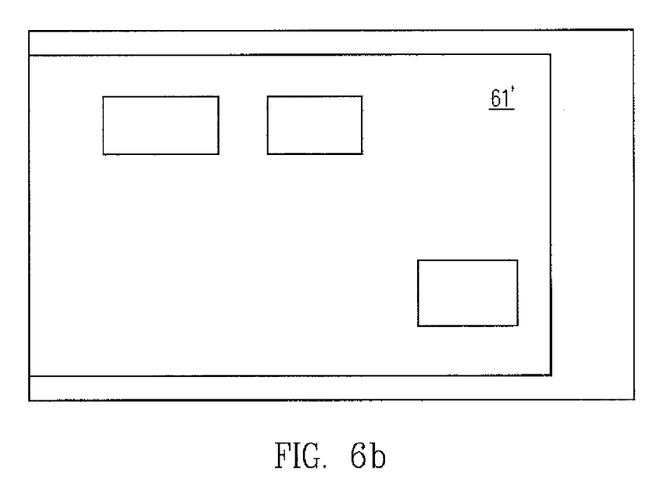

FIG. 6*b* shows the rightmost part of the same building after perspective correction. As can be seen, the lines of windows now appear straight and parallel and the building appears to be equally tall at all points.

According to this embodiment, therefore, a distance map such as the one described above in connection with FIG. 4 may be used to correct for perspective effects. As mentioned above, the size of the areas in the distance map should be selected in a suitable way to ensure smooth transition between objects at different distances. This means that the areas should not be too large. According to an embodiment, the processor 21 is operable to correct for perspective effects, based on the distance map.

Figure 7:
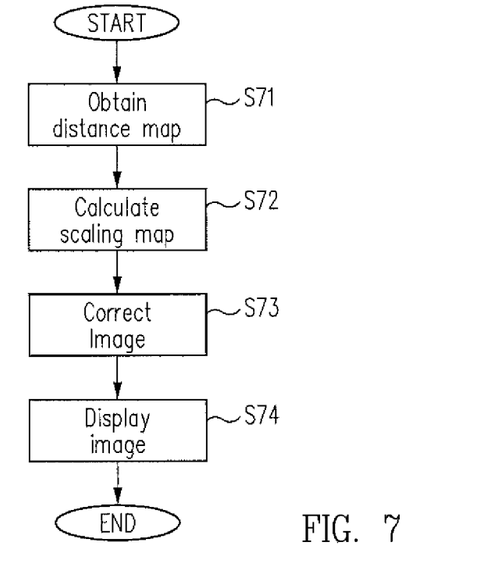
FIG. 7 is a flow chart of a method for correcting perspective according to an example embodiment of the invention.

A method of correcting for perspective effects is shown in FIG. 7.

Step S71: Obtain a distance map for the imaged scene, as previously described.

According to different embodiments described above, distances comprised in the distance map and/or the distance map itself may be obtained from the parallax between a first and a second captured visual image and/or from one or more distance measuring devices.

Step S72: Calculate a scaling map based on the distance map. The scaling map has a scaling factor for each area of the scaling map. The scaling factors are inversely proportional to the distance values in the distance map.

Step S73: Apply the values of the scaling map to the corresponding parts of the image, i.e. of an image of the imaged scene, to correct the image for the effects of perspective.

Step S74: Display the image as corrected in step S73.

In general, the scaling factors are obtained by resampling from number of pixels to distance in meters. Since the detector has a total field of view, each pixel in the detector will have a pixel field of view that is the total field of view divided by the number of pixels in that dimension. To convert to meters the angle of the field of view and the distance to the object are needed.

Perspective effects are typically greater in panoramas of multiple images than in a single image because of the wider field of view in panorama images. In panorama image creation, the distance map can also be used to correct, at least partially, for the distortion caused by camera movement between image capture.

Once the distance to the object for each pixel, or group of pixels, has been determined, the actual size of an object, or an area in the image, can also be determined. As explained above, the distance to each object or area of the image may be determined in the form of a distance map. Again, the field of view of each pixel and the distance to the object together determine the size of the area covered by one pixel. Therefore, the size of an object may be determined by number of pixels covering the object and the distance to the object. According to an embodiment, the processor 21 is operable to determine the actual size or area of an object present in the imaged scene, based on the number of pixels covering the object and the determined distance to the object.

According to an embodiment, effect information relating to parts of the observed scene, or to objects present therein, is measured or calculated in manners known in the art. In thermography context, effect is typically represented as watts per square meter ($W/m^2$). However, by determining the actual size or area of an area in the image or an object, as described above, the effect information may instead be expressed as watts (W), which makes it more intuitive for a user to interpret. Effect values ($W/m^2$ or W) may be displayed to a user as overlaid information in an IR image, a visual light image, a blended image or a fused image, for example using a display integrated in or coupled to the IR camera 1. The effect information may be displayed in real time, on site, or stored for later retrieval, display and analysis.

If the object is large and placed at an angle with respect to the camera, different parts of the observed/imaged scene or object may be at different distances to the camera. In that case, each pixel representing the object will not represent the same area. This may be taken into account by perspective correcting the image as discussed in connection with FIGS. 6a and 6b before calculating the area.

Alternatively the average pixel size may be taken as the size of a pixel in the center of the object, or as the average between pixels at the extreme ends of the object. This will be a fair approximation as long as the object has a regular shape such as a wall. More complex calculations may be performed, including determining the angle of the object relative to the camera based on the distance to different parts of the object.

The distance information, obtained according to any of the embodiments described above, can also be used to determine the parallax between the IR image and one of the visual images to enable fusion between the IR image and the visual image. In addition to the relationship between the parallax between the visual images and the distance to the object (or the focus distance) discussed above, which is only needed for some distance determination embodiments as described above, this application requires information about the relationship between the parallax between the visual image and the IR Image.

The distance-dependence of the parallax between the IR image and one of the visual images can be determined as discussed above with reference to equations (1)-(6) above, applying the equations to the displacement between the IR imaging subsystem and the relevant visual imaging subsystem.

Figure 8:
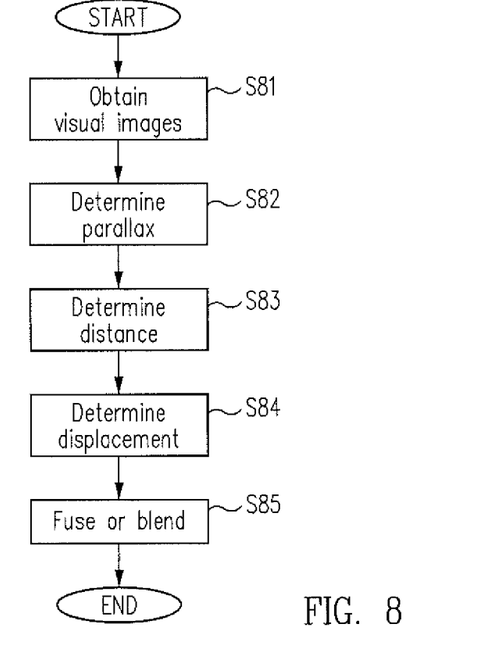
FIG. 8 is a flow chart of a method according to an example embodiment of the invention.

FIG. 8 is a flow chart of the method according to an example embodiment, in which the information is used for parallax correction when fusing or blending an IR image and a visual image.

Step S81: Obtain first and second visual image.

Step S82: Determine the parallax between first and second visual image.

Step S83: Determine the distance to the object, or focus distance.

According to an embodiment, the parallax determined from Steps S81 and S82 is used to determine the distance to the object, or focus distance.

According to another embodiment, Steps S81-S82 are omitted or additionally in Step S83 the distance to the object, or focus distance, is determined using one or more distance measuring devices, such as for example a selection of the following: a distance sensor, a laser range finder, a time of flight sensor and/or an ultra-sonic distance measuring device. According to an embodiment, the processor 21 of the IR camera 1 may be arranged to receive and process distance related information from the one or more distance measuring devices.

Step S84: Use distance to object to determine displacement between IR and visual image.

Step S85: Fuse or blend the IR and visual image as desired using the determined displacement to align the images.

Steps S82-S85 may be performed by a computer program stored in memory and run in the processor 21 of the IR camera.

Methods for aligning images for fusion based on the focus distance or object distance is well known in the art.

Another possible application would be to create a 3D image from the two visual images or from information obtained from one or more distance measuring devices, in ways known in the art, and to colour selected parts of the 3D image with IR information in a similar way to fusion. One way of describing this would be to start with the IR image and superimpose the distance map onto it. This would "raise" areas of the IR image to correspond to a 3D image with IR colouring. Alternatively it may be seen as projecting the IR image onto the distance map.

One additional field of application for the distance map would be to combine several images focused at different object distances into one image. According to an embodiment, the processor 21 is operable to combine several images focused at different distances into one image, based on distance map information. A distance map could be created on the basis of one image and used to determine the relevant distances in the scene. In a simple case, there may be an object at a certain first distance, and a background at a second, greater distance. Once this had been determined, the necessary images could be obtained. In this example this would mean a first image focused at the first distance, and a second image could be obtained focused at the second distance. In the first image therefore, the object would be in focus and in the second image the background would be in focus. The two images could be combined so that the part of the first image representing the object and the part of the second image representing the background are merged to create a new image in which both the object and the background are in focus.

Which parts to use from each image can be determined from the distance map.

Figure 9:
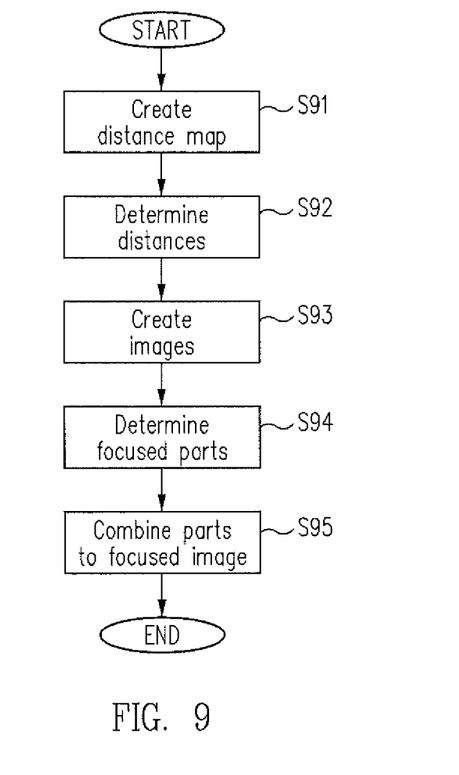
FIG. 9 shows a generalized method of determining which parts of each image to use when combining two images according to an example embodiment.

A generalized method is shown in FIG. 9.

Step S91: Create distance map for a scene as discussed in connection with FIG. 4.

Step S92: Determine the distances to the objects or areas that appear in the distance map.

Step S93: For each of the distances determined in step S92, create an image of the scene focused on the distance.

Step S94: For each of the images generated in step S93, determine which part or parts of the image are in focus, that is, the parts in which the object distance and the focus distance match.

Step S95: Combine the part or parts that are in focus from each image into one combined image. The combined image has the whole scene with every part of the image in focus.

Figure 10:
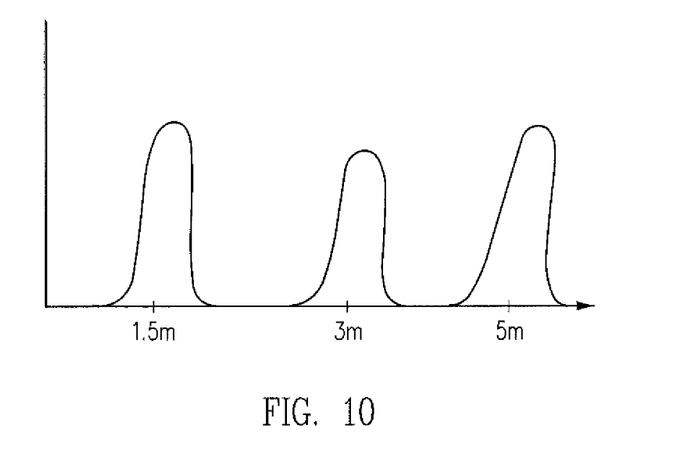
FIG. 10 is a histogram of the distances in an example distance map according to an embodiment.

FIG. 10 is a histogram of the distances in a distance map, for a scene in which one object appears at a distance of 1.5 m, one object appears at a distance of 3 meters and the background is constituted by a wall 5 meters away. In this case, therefore, three images should be taken, with focus distances of 1.5 m, 3 m and 5 m, respectively. For any object above a certain distance a far focus function could be used so that there would be no need to distinguish between objects at different distances above this certain distance.

According to embodiments of the invention, there is provided a computer-readable storage medium comprising computer executable instructions for obtaining a visual image of an observed scene; receiving distance related information from one or more distance measuring devices; determining a distance to the scene based on the received distance related information; and focusing an IR imaging subsystem 3 based on the determined distance.

According to an embodiment, the computer-readable storage medium comprises computer executable instructions for determining at least a first distance and a second distance to at least a first part and a second part of the observed scene. According to an embodiment, the first and second part of the scene corresponds to a first and a second object present in the scene, respectively.

According to an embodiment, the computer-readable storage medium comprises computer executable instructions for calculating a focus distance based on the determined distance to the scene; and focusing the IR imaging subsystem 3 based on the focus distance.

According to an embodiment, the computer-readable storage medium comprises computer executable instructions for determining a displacement between an IR image and a visual image; aligning the IR image and the visual image based on the displacement; and presenting at least one of a fused image or a blended image based on the IR image and the visual image.

According to an embodiment, the computer-readable storage medium comprises computer executable instructions for determining a first and a second displacement for at least a first and a second part of the IR image, respectively; and aligning the first and second part of the image based on the first and second displacement, respectively.

According to an embodiment, the non-transitory computer-readable storage medium comprises computer executable instructions for determining the distance to one or more parts of the observed scene or to objects comprised therein; and presenting the distance information in a distance map.

According to an embodiment, the non-transitory computer-readable storage medium comprises computer executable instructions for controlling the IR optical element to focus on each object in the image separately, based on the distance map.

According to an embodiment, the non-transitory computer-readable storage medium comprises computer executable instructions for combining several images focused at different distances into one image, based on distance map information.

According to an embodiment, the non-transitory computer-readable storage medium comprises computer executable instructions for correcting for perspective effects, based on the distance map.

According to an embodiment, the non-transitory computer-readable storage medium comprises computer executable instructions for determining the actual size or area of an object present in the imaged scene, based on the number of pixels covering the object and the determined distance to the object.

According to one or more embodiments, a computer system having a processor to perform computer executable instructions may represent any type of logic device (e.g., processor executing software code, a programmable logic device operating based on configuration data, and/or an application specific integrated circuit) to implement the various embodiments disclosed herein. Accordingly, reference herein to computer, processor, and/or executable instructions is not limiting and is used generally to refer to various hardware, software, and/or other information that may be implemented to perform the desired operations for various applications discussed herein, as would be understood by one skilled in the art.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A camera comprising:
   an infrared (IR) imaging subsystem configured to obtain IR images of an observed scene, the IR imaging subsystem having an IR detector;
   a visual imaging subsystem configured to obtain a visual image of the observed scene;
   one or more distance measuring devices configured to obtain distance related information regarding a distance from the camera to the scene; and
   a processor configured to receive distance related information from one or more distance measuring devices, the processor further being configured to:
     process the received distance related information, wherein the processing comprises determining a distance to the scene based on the received distance related information,
     determine the distance to one or more parts of the observed scene or to objects comprised therein, present the distance information in a distance map, and combine several images focused at different distances into one image, based on distance map information.

2. The camera of claim 1, wherein the IR imaging subsystem further includes an IR optical element configured to focus IR radiation on the IR detector based on determined distance.

3. The camera of claim 2, wherein the processor is further configured to calculate a focus distance based on the determined distance and the IR optical element is operable to focus IR radiation on the IR detector based on the focus distance.

4. The camera of claim 3, wherein the processor is further configured to:
 determine a displacement between an IR image taken by the IR imaging subsystem and the first visual image taken by the first visual imaging subsystem;
 align the IR image and the first visual image based on the displacement; and
 present at least one of a fused image or a blended image based on the IR image and the visual image.

5. The camera of claim 2, wherein the processor is further configured to:
 determine a displacement between an IR image taken by the IR imaging subsystem and the visual image taken by the visual imaging subsystem;
 align the IR image and the visual image based on the displacement; and
 present at least one of a fused image or a blended image based on the IR image and the visual image.

6. The camera of claim 1, wherein the processor is further configured to:
 determine a displacement between an IR image taken by the IR imaging subsystem and the visual image taken by the visual imaging subsystem;
 align the IR image and the visual image based on the displacement; and
 present at least one of a fused image or a blended image based on the IR image and the visual image.

7. The camera of claim 6, wherein the processor is further configured to:
 determine a first and a second displacement for at least a first and a second part of the IR image, respectively; and
 align the first and second part of the image based on the first and second displacement, respectively.

8. The camera of claim 1, wherein the processor is further configured to control the IR optical element to focus on each object in the image separately, based on the distance map.

9. The camera of claim 1, wherein the processor is further configured to correct for perspective effects, based on the distance map.

10. The camera of claim 1, wherein the processor is further configured to correct for perspective effects by:
 obtaining a distance map for an imaged scene;
 calculating a scaling map based on the distance map; and
 apply the values of the scaling map to the corresponding parts of an image of the imaged scene to correct the image for the effects of perspective.

11. The camera of claim 1, wherein the processor is further configured to determine the actual size or area of an object present in the imaged scene, based on the number of pixels covering the object and the determined distance to the object.

12. A method of focusing a camera having an infrared (IR) imaging subsystem, a visual imaging subsystem, and one or more distance measuring devices, the method comprising:
 receiving distance related information from one or more distance measuring devices;
 determining a distance to the scene based on the received distance related information;
 focusing an IR imaging subsystem based on the determined distance; and
 determining at least a first distance and a second distance to at least a first part and a second part of the scene.

13. The method of claim 12, wherein the first and second part of the scene correspond to a first and a second object present in the scene, respectively.

14. The method of claim 12, further comprising:
 calculating a focus distance based on the determined distance to the scene; and
 focusing the IR imaging subsystem based on the focus distance.

15. The method of claim 12, further comprising:
 determining a displacement between an IR image and a visual image;
 aligning the IR image and the visual image based on the displacement; and
 presenting at least one of a fused image or a blended image based on the IR image and the visual image.

16. The method of claim 12, further comprising:
 determining a first and a second displacement for at least a first and a second part of the IR image, respectively; and
 aligning the first and second part of the image based on the first and second displacement, respectively.

17. The method of claim 12, further comprising:
 determining a distance to one or more parts of the observed scene or to objects comprised therein to provide distance information; and
 presenting the distance information in a distance map.

18. The method of claim 17, further comprising controlling an IR optical element of the IR imaging subsystem to focus on each object in the image separately, based on the distance map.

19. The method of claim 17, further comprising combining several images focused at different distances into one image, based on distance map information.

20. The method of claim 17, further comprising correcting for perspective effects, based on the distance map.

21. The method of claim 12, further comprising:
 obtaining a distance map for an imaged scene;
 calculating a scaling map based on the distance map; and
 apply the values of the scaling map to the corresponding parts of an image of the imaged scene to correct the image for the effects of perspective.

22. The method of claim 12, further comprising determining an actual size or area of an object present in the imaged scene, based on the number of pixels covering the object and the determined distance to the object.

23. A non-transitory computer-readable storage medium comprising computer executable instructions for execution by a processor to perform the method according to claim 12.

* * * * *